(12) United States Patent
Smith et al.

(10) Patent No.: US 7,222,011 B2
(45) Date of Patent: May 22, 2007

(54) ENGINE AND DRIVELINE TORQUE TRANSFER DEVICE CONTROL

(75) Inventors: Anthony L. Smith, Troy, MI (US); Patrick B. Usoro, Troy, MI (US); Chi-Kuan Kao, Troy, MI (US)

(73) Assignee: General Motors Corporation, Detroit, MI (US)

( * ) Notice: Subject to any disclaimer, the term of this patent is extended or adjusted under 35 U.S.C. 154(b) by 260 days.

(21) Appl. No.: 10/898,442

(22) Filed: Jul. 23, 2004

(65) Prior Publication Data
US 2006/0020384 A1    Jan. 26, 2006

(51) Int. Cl.
G06F 7/00 (2006.01)
G06F 17/00 (2006.01)
B60W 10/02 (2006.01)

(52) U.S. Cl. .................... 701/51; 701/54; 192/3.51; 477/180

(58) Field of Classification Search ............. 701/51, 701/54, 60–61, 67, 71; 192/3.51; 477/34, 477/166, 174–176, 180
See application file for complete search history.

(56) References Cited

U.S. PATENT DOCUMENTS

| | | | | |
|---|---|---|---|---|
| 2,700,312 A | | 1/1955 | Smirl | |
| 4,766,967 A | * | 8/1988 | Slicker et al. | 180/54.1 |
| 4,989,686 A | * | 2/1991 | Miller et al. | 180/197 |
| 5,534,764 A | * | 7/1996 | Masaki et al. | 318/802 |
| 5,630,773 A | * | 5/1997 | Slicker et al. | 477/176 |
| 5,669,354 A | * | 9/1997 | Morris | 123/406.24 |
| 5,730,094 A | * | 3/1998 | Morris | 123/192.1 |
| 5,957,255 A | * | 9/1999 | Grytzelius et al. | 192/3.31 |
| 6,299,565 B1 | | 10/2001 | Jain et al. | |
| 6,574,535 B1 | * | 6/2003 | Morris et al. | 701/22 |

OTHER PUBLICATIONS

Hiramatsu et al., Control Technology of Minimal Slip-Type Torque Converter Clutch, SAE-850460, 1986.
Schnieder, Hydro-electric tension belt continuously variable transmission for passenger cars, IMechE C382/079, 1989.
Hirano et al., SCVT—A State of the Art Electronically Controlled Continuously Variable Transmission, SAE-910410, 1991.
Albers, Torque Control Isolation (TCI) The Smart Clutch, 4th International Symposium, Baden-Baden, 1990, pp. 81-107.

* cited by examiner

*Primary Examiner*—Y. Beaulieu
(74) *Attorney, Agent, or Firm*—Kathryn A. Marra

(57) ABSTRACT

A starting clutch control includes an engine control state and a slip control state. The engine and slip control states include feedforward and driveline damping control terms. The engine state control may further include an engine speed control term. The slip control state further includes a clutch slip control term. Changes to clutch engagement commands are frozen upon throttle tip-in events.

17 Claims, 7 Drawing Sheets

US 7,222,011 B2

ENGINE AND DRIVELINE TORQUE TRANSFER DEVICE CONTROL

TECHNICAL FIELD

The present invention is generally related to vehicular powertrains. More particularly, the invention is concerned with vehicular powertrains wherein engine torque is coupled to the driveline across a controlled capacity torque transfer device in lieu of an hydrostatic torque converter.

BACKGROUND OF THE INVENTION

In a conventional automatic transmission drivetrain, a torque converter is located between the crankshaft of an internal combustion engine and a multiple speed ratio transmission. The torque converter functions to provide fluidic coupling of the engine output to the driveline generally at low vehicle speeds (higher transmission speed ratios). Vehicle launch performance is enhanced by the torque converter's torque multiplication effects. And, the fluidic coupling of the torque converter also provides effective decoupling of engine torque pulsations to the driveline and, perhaps more significantly, damping of driveline torsional disturbances back to the engine. Generally at higher vehicle speeds (i.e. lower transmission speed ratios) and light throttle, the fluidic coupling of the torque converter may be replaced with the direct mechanical coupling of the engine to the driveline via a torque converter clutch (TCC). The output side of the TCC typically includes damping springs to attenuate the effects of the periodic torque pulsations occasioned by the cylinder events of the internal combustion engine on the driveline and any driveline disturbances back to the engine.

Torque converters have inherent efficiency shortfalls as some portion of the input energy is lost to the fluid. It is known to control the TCC at higher speed ratios and at points in a driving cycle normally reserved for fluidic coupling by the torque converter. Such early TCC control is additionally distinguished from conventional TCC lock-up, however, in that a slip is maintained across the TCC to provide some damping and isolation between the engine and the driveline. Such control may be generally referred to as controlled capacity TCC control.

While the torque converter achieves many vehicle performance and driveline isolation objectives commendably, it is recognized that the fluidic losses of such devices suggests opportunity for improving vehicle efficiency. While controlled capacity TCC improves upon the fluidic losses of the torque converter, fluid losses still remain as does the substantial hardware and mass—including substantial fluid mass associated with necessary coupling fluid—associated with a torque converter and TCC complement.

So called starting clutches have been proposed for replacing the torque converter. In essence, starting clutches have been proposed to effect many of the benefits of the torque converter clutch during vehicle launches without being encumbered by the fluidic losses associated therewith. Additionally, many of the benefits of a controlled capacity TCC are believed possible by employing such a starting clutch without many of the hardware and mass penalties associated with a torque converter and TCC complement. However, the inherent damping characteristics (or lack thereof) associated with starting clutches are substantially less ideal than those of the fluidic coupling of the torque converter and present significant challenges to attaining acceptable levels of driveline disturbance in such a system.

SUMMARY OF THE INVENTION

A vehicular starting clutch control provides responsive vehicle launches and favorable driveline damping during launch, cruising and torque reversals. A driveline damping control is effective during launch and subsequently during slip control to actively attenuate driveline disturbances. Tip-in management is effective to delay changes to clutch capacity until clutch slip has changed direction to reduce any driveline disturbances that may be introduced by rapid torque reversals across the starting clutch.

A vehicular starting clutch control includes providing an engagement command which includes a driveline feedback portion having an acceleration term and a jerk term, determined as functions of driveline member acceleration and jerk, and controlling engagement of the torque transfer device in accordance with the engagement command. A feedforward control is responsive to throttle pedal position and provides an open loop control portion during vehicle launch and in subsequent slip state control. A clutch slip control is responsive to slip across the starting clutch and provides a closed loop control portion subsequent to vehicle launch. An engine speed control is responsive to engine speed and provides a closed loop control portion during vehicle launch.

BRIEF DESCRIPTION OF THE DRAWINGS

The present invention will now be described, by way of example, with reference to the accompanying drawings, in which:

FIG. 4 is a detailed control schematic of certain preferred control implementations of the methods of the present invention wherein

DESCRIPTION OF THE PREFERRED EMBODIMENT

Figure 3:
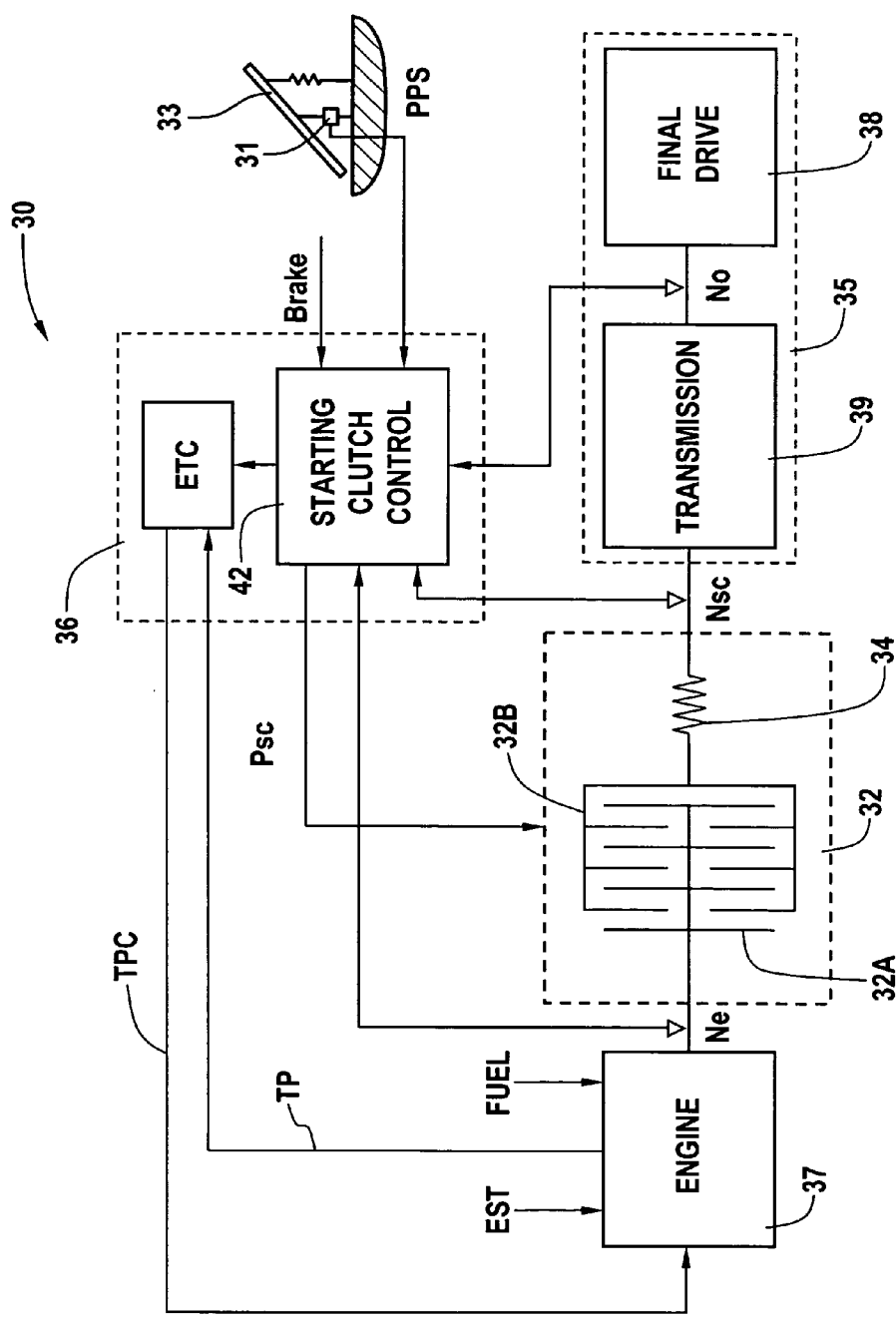
FIG. 3 is a schematic block diagram of an exemplary hardware and control representation of a preferred vehicular powertrain system for implementing the control of the present invention.

With reference first to FIG. 3, a vehicular powertrain system 30 includes an internal combustion engine 37 coupled to a driveline 35. The driveline includes a transmission 39, such as a multiple speed ratio transmission having a plurality of forward-speed ratios controlled in accordance with transmission shift controls operative to control electrohydraulic circuits for establishing the various speed ratios and shifts therebetween. The driveline further includes final drive 38 which as used herein includes all other driveline components found after the transmission output including final drive gearsets, differential gearsets, propshafts, halfshafts, constant velocity joints, etc. The engine 37 has an output that is mechanically coupled to one side 32A of a starting clutch 32. The other side 32B of the starting clutch 32 is mechanically coupled to an input member of the transmission 39. Preferably, the starting clutch includes a complement of spring dampers 34 predominantly effective to attenuate the effects of the periodic ignition events upon the driveline 35. While shown at side 32 B, dampers 34 may be located at either side of starting clutch 32.

A computer based powertrain control module (PCM) 36 of any conventional design includes such common components as a microprocessor, read only memory (ROM), random access memory (RAM), electrically programmable read only memory (EPROM), high speed clock and timer processing unit (TPU), analog to digital (A/D) and digital to analog (D/A) circuitry, and input/output circuitry and devices (I/O) and appropriate signal conditioning and buffer circuitry. Such a controller may be dedicated to engine control and diagnostic functionality or may combine engine and transmission control and diagnostic functionality. Therefore, within standard memory devices, e.g. ROM, are stored a plurality of routines for carrying out engine and transmission control and diagnostic operations. Each routine includes a sequence of instructions which are executed by the microcontroller following preestablished engine events or on a timed basis. Exemplary routines which may be repeatedly executed following successive engine cylinder events while the engine is operating, include fuel control and spark timing routines for generating and issuing a fuel command FUEL and a spark timing command EST, respectively. These commands are provided to respective fuel controllers and ignition controllers (not separately illustrated) for controlling fuel delivery and ignition timing for each cylinder event. Other routines, including the starting clutch control routines of the present invention, are executed on a time basis, for example during regular periodic control loops.

An operator-controlled accelerator pedal 33, a.k.a. throttle pedal, is manually depressed by a vehicle operator to indicate a desired engine operating level. The degree of depression of the pedal away from a rest or low angle position is transduced by conventional potentiometric position sensor 31 into throttle pedal position signal PPS, which is provided as a control input to PCM 36 as an indication of a desired engine operating level. Intake air throttle valve actuation and throttle position sensing are preferably accomplished by conventional throttle actuation and throttle position sensing hardware (not separately illustrated) in accord with a conventional electronic throttle control (ETC) system including an ETC control in PCM 36. Basically, PCM provides a throttle position command (TPC) to the throttle actuation hardware, e.g. stepper motor and gearing, which positions the throttle valve substantially as commanded. The throttle valve position sensing hardware, e.g. potentiometric position sensor, provides a throttle position signal (TP) back to PCM 36 which is used in conjunction with PPS in a closed loop ETC control.

PCM 36 includes a starting clutch control 42 for effecting starting clutch control and diagnostic functions, including the control and methods of the present invention as further described herein below. Starting clutch control 42 includes PPS input, vehicle brake state input (BRAKE) and a plurality of powertrain speed metrics including engine output speed (Ne), starting clutch output speed (Nsc) and transmission output speed (No). It is noted here that the engine output speed Ne is substantially equivalent to the starting clutch input speed, and the starting clutch output speed Nsc is typically equivalent to the transmission input speed. The starting clutch control provides an engagement command (Psc) to effect a variable engagement force of the starting clutch which in turn establishes the torque capacity of the clutch. In accordance with certain alternative embodiments, the starting clutch control may also affect the ETC as will be further described herein below.

In a preferred implementation, starting clutch is a hydraulically controlled wet clutch comprising a clutch pack controllably engageable in accordance with pressurized fluid provided to an apply chamber (not shown) which acts on a piston to vary the engagement force across the clutch elements. The piston engagement force from the apply chamber pressure is also acted against by a return spring load. In such an arrangement, the engagement command, Psc, would control a pressure control solenoid to modulate hydraulic pressure supplied to the apply chamber as is well known in the art of transmission controls. Alternatively, it is envisioned that any of a variety of torque transfer devices, including magnetorheological and electrorheological fluid based clutches, may be employed in practicing the present invention.

Figure 1:
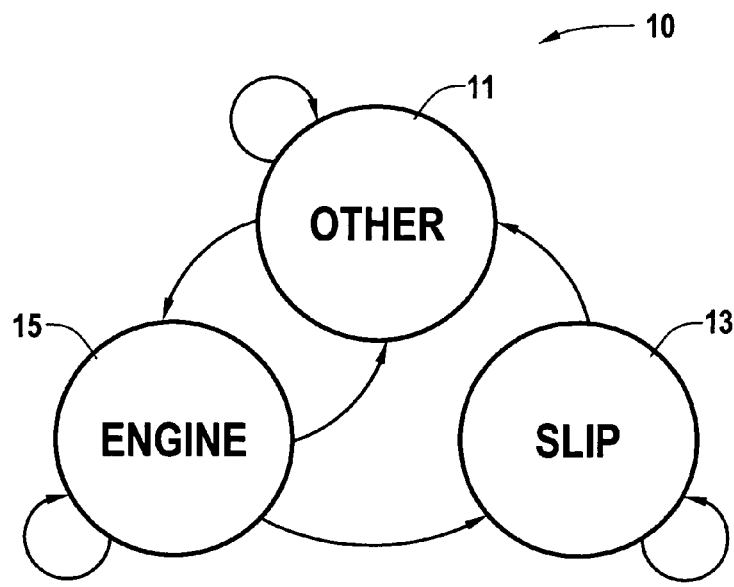
FIG. 1 is a control state diagram illustrating certain control states and transition paths therebetween in accordance with the present invention.

Starting clutch control 42 is preferably implemented as part of a starting clutch state control, a portion of which most relevant to the present invention is illustrated in FIG. 1. Therein, state control diagram 10 shows an engine speed control state (ENGINE) 15 for vehicle launch, a starting clutch slip control state (SLIP) 13 for most other vehicle driving operating conditions and an aggregate control state (OTHER) 11 representing a plurality of such other control states as may be required in a complete vehicular application, e.g. vehicle creep, torque decoupled (Neutral/Park), etc. The ENGINE and SLIP states are most relevant to the control of the present invention. Valid transitions between the various states illustrated are shown by directional lines therebetween, including maintenance within a state as illustrated by the respective directional lines looping from and to the same state.

In accordance with the starting clutch state control, engagement command, Psc, is determined. Psc includes several contributory engagement terms that are calibrated to provide predetermined functionality and meet objectives. Each starting clutch state comprises a unique combination of various contributory engagement terms and the engagement terms contributing to Psc are determined in accordance with the starting clutch state. These contributory engagement terms may be open loop or closed loop in nature as further described herein below.

Figure 2:
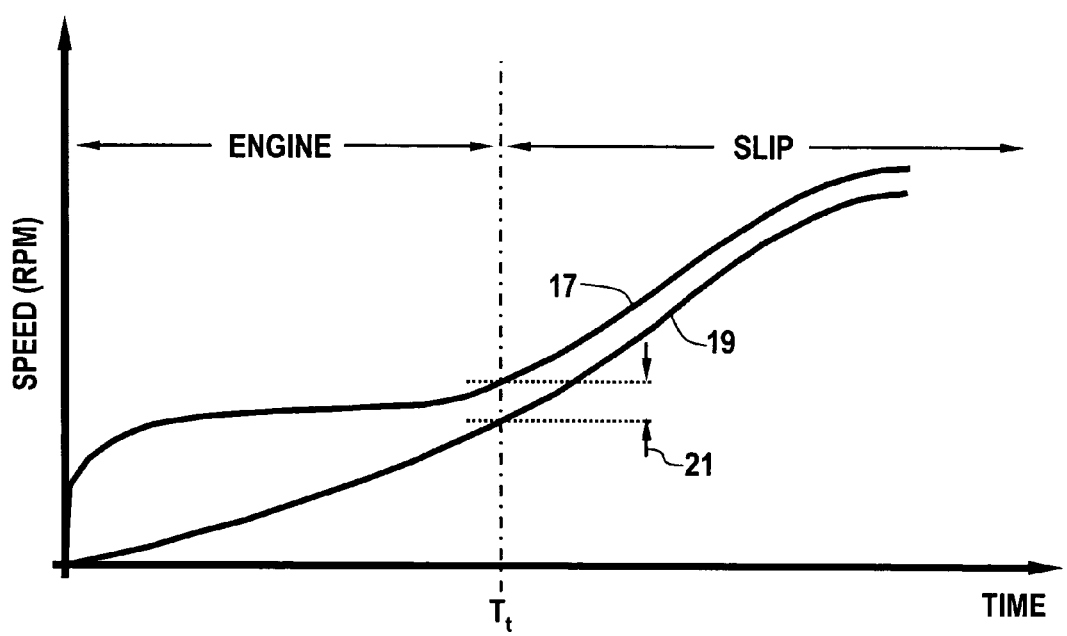
FIG. 2 shows speed versus time plots of an internal combustion engine output coupled to one side of a starting clutch and a driveline input coupled to the other side of the starting clutch illustrating an exemplary vehicle launch in an engine speed control state and subsequent transition to a starting clutch slip state.

With reference now to FIG. 2, a characteristically typical vehicle launch operation through ENGINE state and transition and continued operation through SLIP state is illustrated with respect to speeds at opposite sides of the starting clutch.

The starting clutch input speed (i.e. engine speed), Ne, labeled 17 and the starting clutch output speed, Nsc, labeled 19 are plotted versus time progression. The separation magnitude between Ne and Nsc is starting clutch slip (Ns). An exemplary slip labeled 21 in FIG. 2 is shown at time Tt corresponding to a transition from ENGINE state control to SLIP state control. In fact, a transition from ENGINE state control to SLIP state control is preferably initiated or enabled when the transmission input speed and engine speed converge and the starting clutch slip, Ns, falls below a predetermined minimum slip. During ENGINE state, the control establishes Psc with the main objective of controlling engine speed, Ne. During SLIP state, the control establishes Psc with the main objective of controlling starting clutch slip, Ns. Engagement command, Psc, is established in ENGINE state in accordance with the following relationship:

$$Psc = Pb + Pff\_filt + Pe + Paj \quad (1)$$

wherein
Pb is an open loop bias control term;
Pe is a closed loop engine speed control term;
Pff_filt is an open loop feedforward control term; and
Paj is a closed loop damping control term.

Engagement command, Psc, is established in SLIP state in accordance with the following relationship:

$$Psc = Pb + Pff\_filt + Ps + Paj \quad (2)$$

wherein
Pb is an open loop bias control term;
Pff_filt is an open loop feedforward control term;
Ps is a closed loop slip control term; and
Paj is a closed loop damping control term.

The open loop bias term appearing in both the ENGINE and SLIP state control relationships (1) and (2) above, contributes in the present exemplary hydraulic clutch implementation an apply chamber pressure sufficient to substantially counteract the return spring force acting against the engagement of the clutch elements and to provide a small pre-load to the clutch elements. Additionally, the stored data set may be adaptively modified to compensate for slowly time-varying changes in the clutch pre-load, for example due to compression of friction elements over time. The bias pressure term does not provide any significant contribution to torque transfer capacity across the starting clutch. Such bias pressure is not particularly critical to the control of the present invention; however, the term carries over into the OTHER states upon transitions out of the ENGINE and SLIP states and is provided in this description for appropriate contextual understanding of the state control. The main objective of the bias term is to assure responsive launch of the vehicle upon transition from OTHER states into ENGINE state.

Figure 4A:
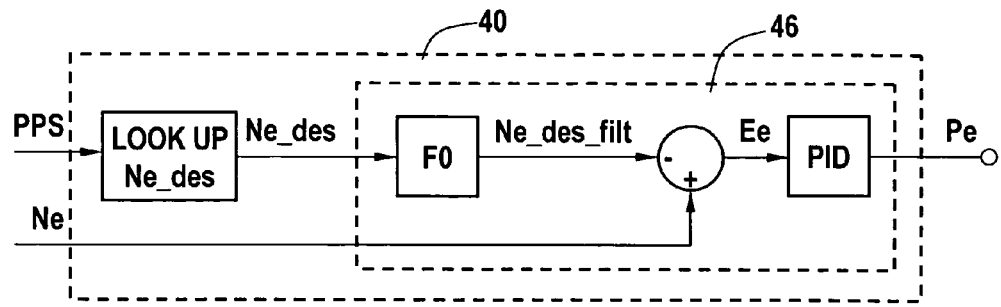
FIG. 4A is a closed loop engine speed control.

Referring to FIG. 4A which is particularly relevant to the ENGINE state, an engine speed control 40 is illustrated wherein the engine speed control term, Pe, is established in accordance with a closed loop engine speed control 46 as follows. Throttle pedal position, PPS, is used to establish a desired engine speed (Ne_des). Preferably this determination is accomplished in accordance with a set of calibration data stored in table format within the memory structure, typically EPROM, of the PCM. Such calibration data may be established through conventional dynamometric experiments designed to establish the engine speed response (such as shown in FIG. 2) during ENGINE state in accordance with various objectives including maximizing engine torque output, minimizing brake specific fuel consumption or engine out emissions and blended performance, fuel economy and emission objectives. It is also envisioned that the type of performance characteristics may be tailored by operator selection, such as by a performance, economy or low torque winter driving mode selection switch. Additionally, the performance characteristics of the stored data set may be adaptively modified in response to learned driving habits of the vehicle operator, slowly varying parameter changes and differences related to normal clutch and engine build variations. Preferably, the desired engine speed, Ne_des, undergoes conventional low pass filtering, F0, using current engine speed, Ne, as an initial value to provide a filtered desired engine speed (Ne_des_filt). Filtering here provides smooth engagement control effective to avoid undesirable driveline excitation and torsional vibration modes. Engine speed, Ne, and filtered desired engine speed, Ne_des_filt, are combined to establish engine speed error (Ee). The error, Ee, is provided to a conventional proportional-plus-integral-plus-derivative controller (PID) to establish the closed loop engine speed control term, Pe. Through developmental testing, it has been determined that the PID gains that effect stable control of engine speed are generally very small and may, in certain systems, be set to zero thereby resulting in the closed loop engine speed control term, Pe, collaping to zero also.

Figure 4B:
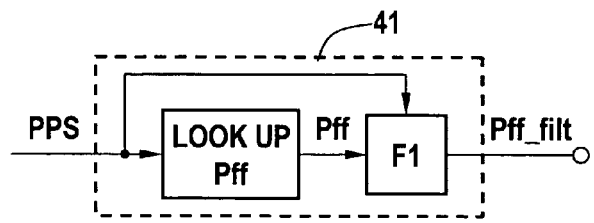
FIG. 4B is an open loop feed forward control.

With reference to FIG. 4B, a feedforward control 41 is illustrated wherein the feedforward control term, Pff, is responsive to the throttle pedal position as represented by PPS. Pff is preferably established in accordance with a set of calibration data stored in table format within the memory structure, typically EPROM, of the PCM. Such calibration data may be established through conventional dynamometric experiments designed to establish the engine speed response (such as shown in FIG. 2) during ENGINE state in accordance with various objectives including maximizing engine torque output, minimizing brake specific fuel consumption or engine out emissions and blended performance, fuel economy and emission objectives. It is also envisioned that the type of performance characteristics may be tailored by operator selection, such as by a performance, economy or low torque winter driving mode selection switch. Additionally, the performance characteristics of the stored data set may be adaptively modified in response to learned driving habits of the vehicle operator. Preferably, the feedforward control term, Pff, undergoes conventional low pass filtering, F1 using zero as an initial value since entry into ENGINE state is from one of the OTHER states which have no equivalent feedforward control term. The filtering is also preferably a function of the throttle pedal position wherein the time constant may be adjusted in accordance with the throttle pedal position and trend of Pff, i.e. increasing or decreasing.

Figure 4C:
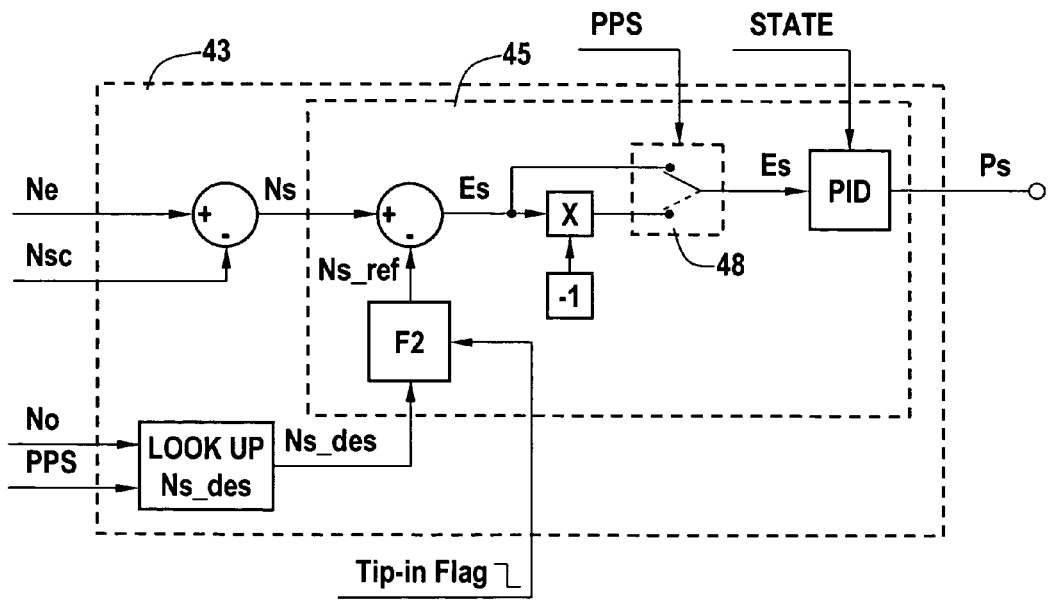
FIG. 4C is a closed loop slip control.
Figure 5:
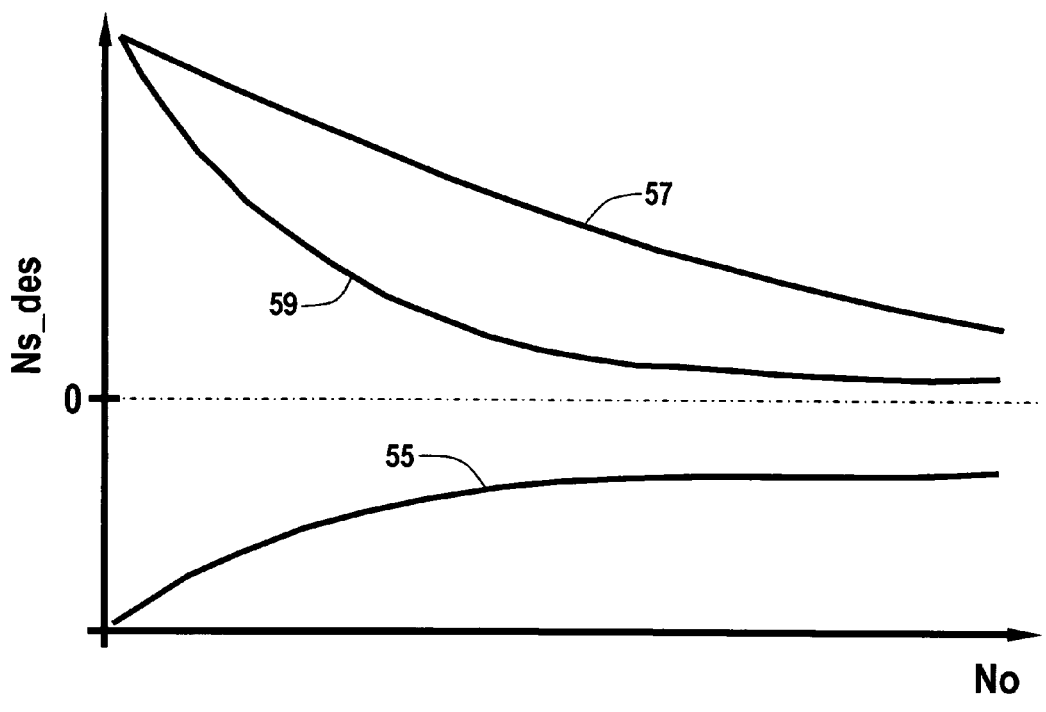
FIG. 5 shows desired starting clutch slip versus transmission output speed plots for various throttle pedal positions at positive and negative driveline torques useful in establishing desired starting clutch slip speed for use in the SLIP state control of the present invention.

A clutch slip control 43 is illustrated in FIG. 4C wherein the slip control term, Ps, is established in accordance with a closed loop slip control 45 as follows. Engine speed, Ne, and starting clutch output speed, Nsc, are combined to establish the clutch slip speed, Ns. Within the closed loop control 45, a desired clutch slip speed (Ns_des) is preferably determined as a function of transmission output speed, No, which is a ratioed indication of vehicle speed, and throttle pedal position, PPS. Ns_des is therefore preferably established in accordance with a set of calibration data stored in table format within the memory structure, typically EPROM, of the PCM. The general characteristics of such calibration data are illustrated in FIG. 5 which shows a extreme high and low throttle pedal position curves 57 and 59, respectively, for positive desired slip speeds, i.e. positive drivetrain output torque. A third curve labeled 55 corresponds to a substantially fully released throttle pedal and illustrates the general characteristics of calibration data for negative desired slip speeds, i.e. engine braking. The negative desired slip speed data was derived based on data for a torque converter equipped vehicle and therefore substantially emulates torque converter characteristic feel. Ns_des is also preferably filtered by a conventional low pass filter F2 to provide slip speed reference (Ns_ref) using actual starting clutch slip as an initial value. The slip speed calibration data may be established with consideration of factors such as engine isolation effectiveness considering expected levels of engine speed oscillation, and desired levels of engine braking. The levels of engine braking may be calibrated to mimic the feel of a torque converter powertrain. The engine braking feel may also be operator set in accordance with preferences for a performance feel, i.e. more aggressive engine braking, or a touring feel, i.e. a less aggressive engine braking. The filtering, F2, may also be reset in response to a throttle tip-in-condition as described herein below.

Clutch slip speed, Ns, and reference clutch slip speed, Ns_ref, are combined to establish clutch slip speed error (Es). The error, Es, is provided to a conventional proportional-plus-integral-plus-derivative controller (PID) to establish the closed loop slip control term, Ps. The clutch slip speed error, Es, is inverted in sign by switch 48 in response to PPS signal. A released throttle which results in engine braking torque and, as described with reference to FIG. 5 herein before, negative desired slip speeds, Ns_des, requires this sign reversal. Absent the sign reversal, the negative reference slips would not be attainable as the clutch would increase torque capacity until lock-up and remain locked up. PID is preferably resettable in response to control state transitions, particularly transitions into SLIP state. For example, to minimize objectionable discontinuities in starting clutch torque capacity, Ps is initialized at a value corresponding to the current slip speed, Ns. A similar initialization may also be accomplished in response to a throttle tip-in condition as described herein below.

Figure 4D:
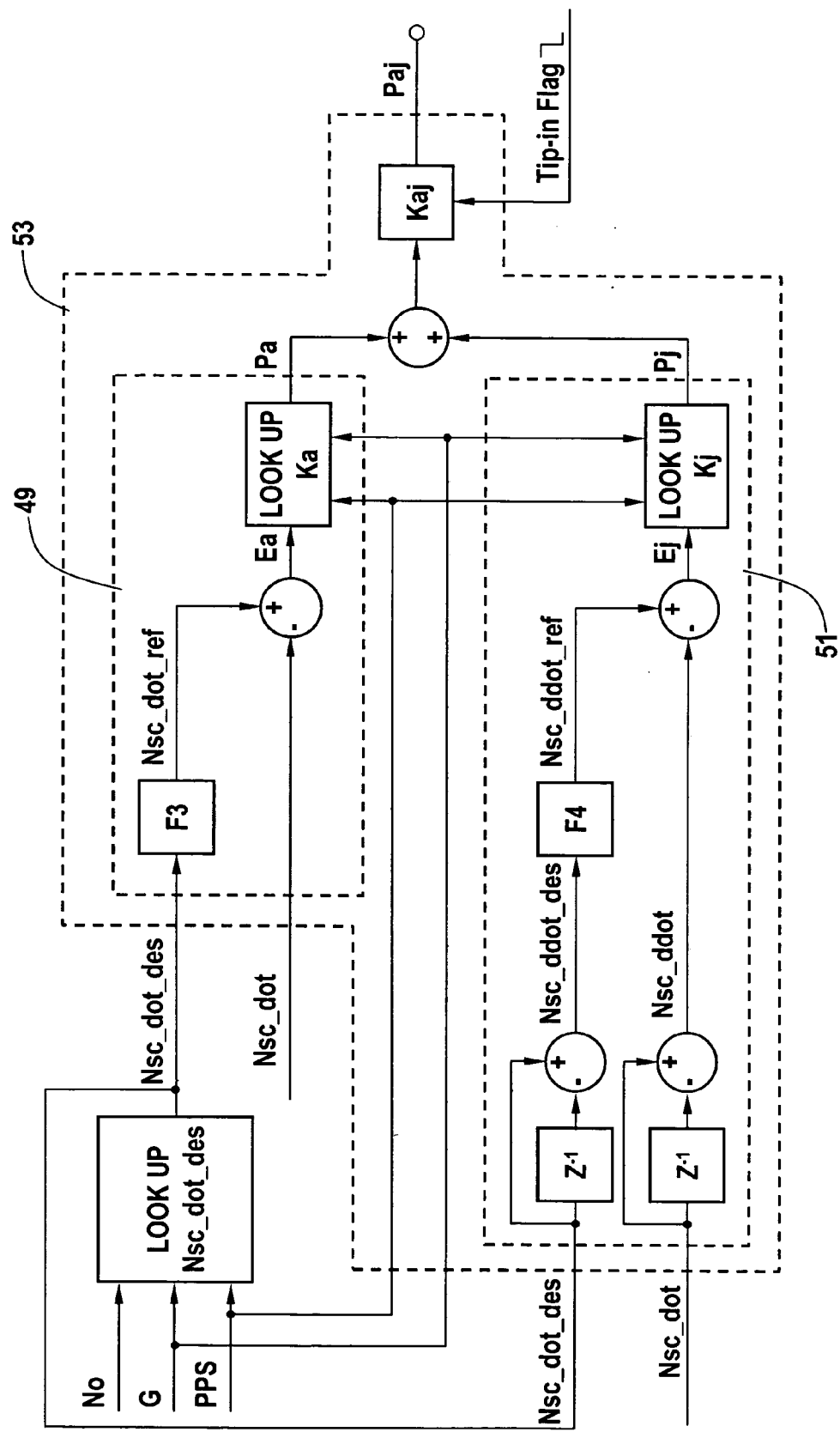
FIG. 4D is a closed loop damping control.

A driveline feedback control 53 is illustrated in FIG. 4D wherein the closed loop damping control term, Paj, is established in accordance with an acceleration control 49 and a jerk control 51 as follows. A driveline member, in this embodiment the starting clutch output (transmission input), is monitored for rotational speed, Nsc. Conventional techniques, such as a Kalman estimator, are utilized to derive starting clutch output acceleration (Nsc_dot) from the starting clutch output speed, Nsc. A value for desired starting clutch output acceleration (Nsc_dot_des) is determined, preferably as a function of transmission output speed, No, which is a ratioed indication of vehicle speed, and throttle pedal position, PPS, and the present transmission gear ratio (G). This determination is preferably accomplished in accordance with a set of calibration data stored in table format within the memory structure, typically EPROM, of the PCM. Such calibration data may be established through conventional dynamometric experiments. Nsc_dot_des is also preferably filtered by a conventional low pass filter F3 to provide starting clutch output acceleration reference (Nsc_dot_ref) using actual starting clutch output acceleration as an initial value. Nsc_dot and Nsc_dot_ref are combined to establish an acceleration error (Ea). A gain (Ka) is then applied to the error, Ea, to establish a driveline acceleration control term (Pa). The gain, Ka, is preferably established as a function of the present transmission gear ratio, G, and throttle position, PPS. Ka may be established in accordance with a set of calibration data stored in table format within the memory structure, typically EPROM, of the PCM.

A derivative-type processing of Nsc_dot by jerk control 51 yields the starting clutch output member jerk (Nsc_ddot) by calculating the difference between the prior and current period values for Nsc_dot. Nsc_dot_des, determined as previously described with respect to use in acceleration control 49, also undergoes a derivative-type processing to provide the desired starting clutch output member jerk (Nsc_ddot_des) by calculating the difference between the prior and current period values for Nsc_dot_des. Nsc_ddot_des is also preferably filtered by a conventional low pass filter F4 to provide starting clutch output jerk reference (Nsc_ddot_ref) using actual starting clutch output member jerk as an initial value. Nsc_ddot and Nsc_ddot_ref are combined to establish a jerk error (Ej). A gain, Kj, is then applied to Ej to establish a driveline jerk control term (Pj). The gain, Kj, is preferably established as a function of the present transmission gear ratio, G, and throttle position, PPS. Kj may be established in accordance with a set of calibration data stored in table format within the memory structure, typically EPROM, of the PCM. The driveline jerk control term, Pj, provides a first-order lead to the driveline acceleration control term, Pa, effective to cancel out a first-order lag in the Kalman estimator signal and the actuator dynamics.

The driveline acceleration control term, Pa, and the driveline jerk control term, Pj, are then combined to establish a single consolidated driveline damping control term (Paj). A gain (Kaj) is then applied to Paj effective to decay the driveline damping control term Paj subsequent to a transient driveline event i.e. excessive acceleration or jerk driveline components. Such driveline events may be occasioned by disturbance sources such as transient wheel slip or lock-up, driveline excitation at natural resonant frequencies, rapid throttle changes or driveline torque reversals for example. The preferred gain, Kaj, is a unity gain that decays exponentially to zero. The gain, Kaj, is preferably responsive to a throttle tip-in condition as described herein below.

Figure 4E:
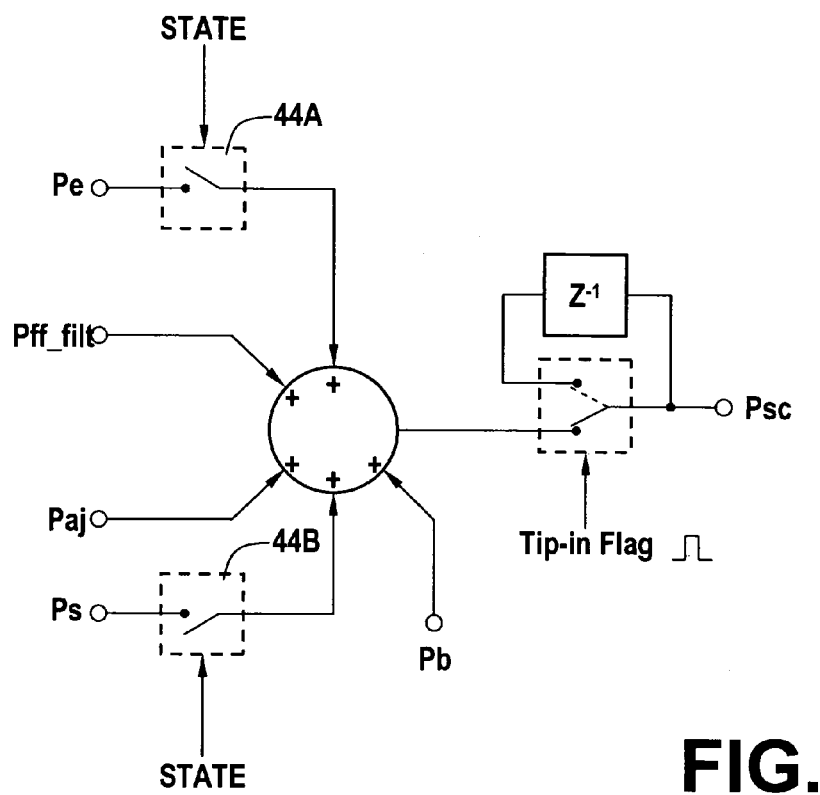
FIG. 4E is a control summation including state transitions and throttle tip-in freeze.

State transitions, as illustrated in FIG. 4E, are seen to determine whether any such closed loop slip control term, Ps, and closed loop engine speed control term, Pe, are selected by switches 44A and 44B as part of the engagement command, Psc. With reference back to the relationships in (1) and (2), the engagement command is seen as including the closed loop slip control term, Ps, in the SLIP state and not including it in the ENGINE state, and including the closed loop engine speed control term, Pe, in the ENGINE state and not including it in the SLIP state.

The driveline damping control term, Paj, is then combined with the feedforward control term, Pff_filt, and the engine speed control term, Pe, in the ENGINE state control and with the feedforward control term, Pff_filt, and the slip control term, Ps, in the SLIP state control to establish the respective starting clutch engagement command, Psc. Additional control terms, e.g. bias control term, Pb, may also be added as appropriate but are not critical to exemplifying the present invention.

A vehicular driveline may be easily excited as alluded to earlier by a sudden rise in engine torque. And rapid changes in engine torque generally follow rapid increases in throttle pedal position, also commonly referred to as throttle tip-in or just tip-in. Tip-in is a condition that is common in vehicle launches (i.e. during ENGINE state control) and during SLIP state control. Additionally, torque reversals, such as when a vehicle coasting with engine braking (i.e. negative driveline torque) is subjected to a tip-in condition, are particularly undesirable since they introduce high jerk in the driveline due to gear lash.

Figure 6:
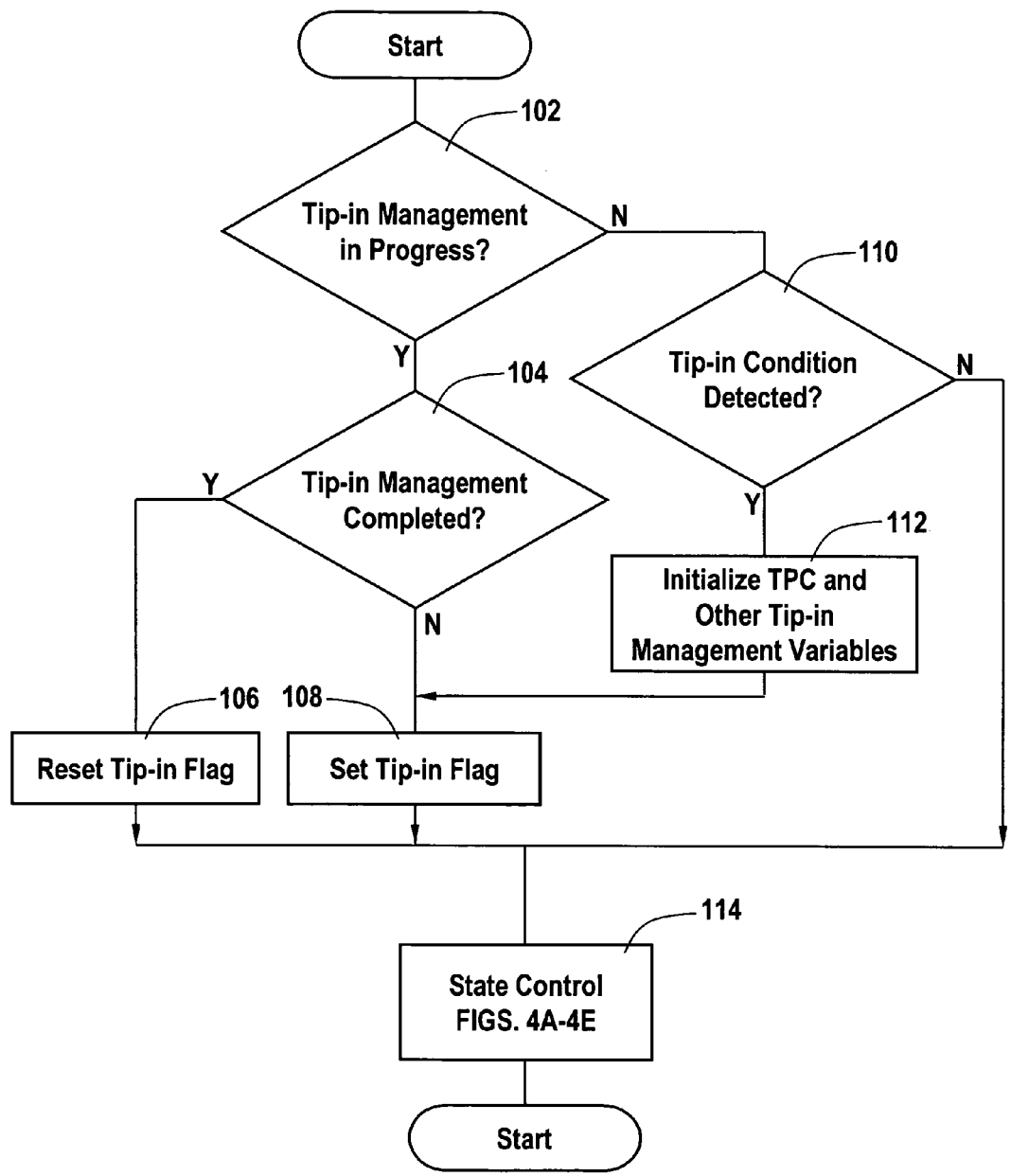
FIG. 6 is a flow diagram illustrating various exemplary steps of an accelerator tip-in condition management routine for use in conjunction with the control of the present invention.

With continued reference to FIGS. 4A–4E and additional reference now to FIG. 6, management of tip-in conditions in accordance with the present invention is hereafter described. Throttle position, PPS, is continually being monitored and updated as conventionally practiced. Throttle changes are determined in accordance with the derivative or time rate of change of throttle position. Throttle changes in excess of a predetermined threshold are generally considered tip-in. For the purposes of the present control, setting a tip-in flag additionally requires that the throttle pedal start from a substantially released position, e.g. less than about 15% PPS and clutch slip be less than a predetermined amount. The throttle position test ensures that desired passing maneuvers are not undesirably limited by the present control and the slip check ensures that if sufficient slip already exists that the additional actions of the tip-in management to be described are not unnecessarily contributed by the present control. Additionally, it is desirable to limit the tip-in flag setting only when vehicle speed is above a predetermined minimum and less than a predetermined maximum, e.g. 11 KPH and 200 KPH, respectively. This maintains integrity of both vehicle launches and cruising maneuvers such as passing. The tip-in flag for purposes of the present control will be reset upon additional conditions to be described herein below.

The flow diagram of FIG. 6 represents various software encoded steps executed as part of the overall code within the PCM for carrying out the control of the present invention. Beginning at step 102, a determination is made whether tip-in management in accord with the present invention is in progress by checking the status of the tip-in flag. If the tip-in flag does not indicate a tip-in management in progress, i.e. set or high state, then step 110 next determines whether a tip-in condition has been detected. Where a tip-in is not detected at step 110, then step 114 represents state control in accordance with the previously described controls of FIGS. 4A–4E and a tip-in flag in an unset or low state as described further herein below. But a detected tip-in condition at step 110 will result in step 112 effecting an initialization of the throttle position command, TPC, for use in the tip-in management of the present invention and initialization or storage of control variables which may be needed in the subsequent tip-in management, for example engine speed at tip-in management inception as further described herein below. From step 112, step 108 next sets tip-in flag to a high state. Step 108 passes to step 114 whereat control in accordance with the previously described controls of FIGS. 4A–4E and further with a tip-in flag in a set or high state as described further herein below. If at step 102 the tip-in flag indicates a tip-in management in progress, i.e. set or high state, then step 104 determines whether the tip-in management is concluded in accordance with predetermined conditions. For example, subsequent to a throttle tip-in condition, tip-in management may be concluded upon detection of current engine speed exceeding the engine speed as recorded at tip-in management inception plus a predefined differential, e.g. 50 RPM, at step 112. Alternatively, tip-in management may be concluded upon starting clutch slip, Nsc, exceeding a predetermined slip calibration, e.g. 200 RPM. Where tip-in management is not concluded, step 108 maintains tip-in flag in a set state. Step 108 passes to step 114 whereat control in accordance with the previously described controls of FIG. 4 and further with a tip-in flag in a set or high state as described further herein below. A concluded tip-in management determined at step 104 passes to step 106 whereat tip-in flag is reset to a low state. Step 106 passes to step 114 whereat control in accordance with the previously described controls of FIGS. 4A–4E and further with a tip-in flag in a cleared or low state as next described.

The starting clutch control 42 of FIGS. 4A–4E is responsive to the tip-in flag settings resulting from the tip-in management just described in conjunction with the flow diagram of FIG. 6. Transition of the tip-in flag from the low to the high state indicating a necessity for tip-in management results in the latching of the present value of the engagement command, Psc, effectively freezing the starting clutch torque capacity at the capacity at the beginning of the tip-in condition (FIG. 4E). Transition of the tip-in flag from the high state to the low state indicating conclusion of tip-in management results in the unlatching of the engagement command, Psc, effectively allowing changes to the starting clutch torque capacity in accordance with the active one of the ENGINE and SLIP state controls. Clutch slip control 43 additionally responds to the transition of the tip-in flag from the high state to the low state by resetting PID to provide a slip control term, Ps, effective for the present slip conditions, e.g. transferring the old PID value to the integrator to maintain continuity (FIG. 4C). In other words, to minimize objectionable discontinuities in starting clutch torque capacity, Ps is initialized at a value corresponding to the current slip speed, Ns. Additionally, filtering, F2, responds to the tip-in flag transition low to reset the reference clutch slip speed to the present actual clutch slip speed, Ns.

The driveline feedback control 53 of FIG. 4D is similarly responsive to the tip-in flag settings resulting from the tip-in management. Transition of the tip-in flag from the high state to the low state indicating conclusion of tip-in management results in the initialization of the gain, Kaj, such that the driveline damping control term, Paj, is fully applied to the engagement command, Psc, upon the conclusion of the tip-in management.

FIGS. 7A–7D are all plotted against a common time progression axis and illustrate an exemplary electronic throttle control tip-in management.

Figure 7A:
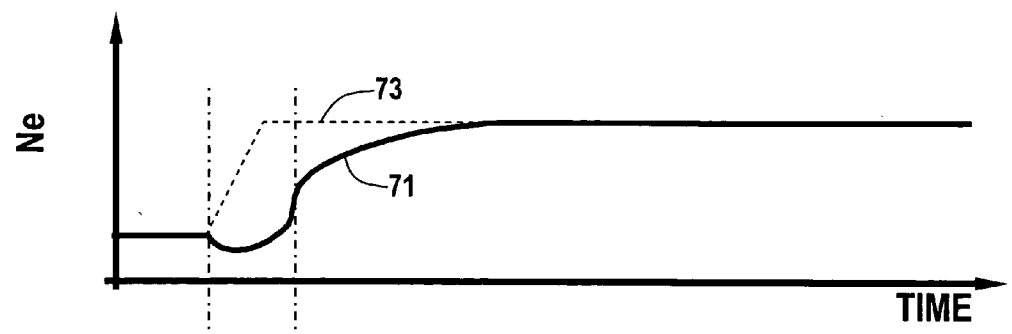
FIGS. 7A–7D are various plots illustrative of an implementation of an electronic throttle control routine as illustrated in the flow diagram of FIG. 6.
Figure 7B:
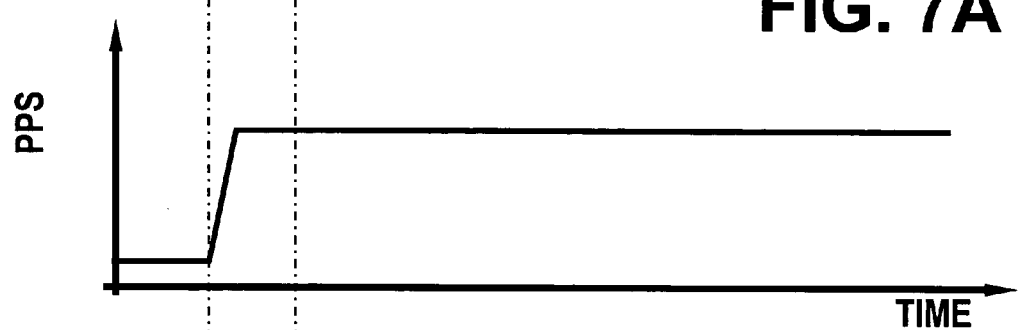
Figure 7C:
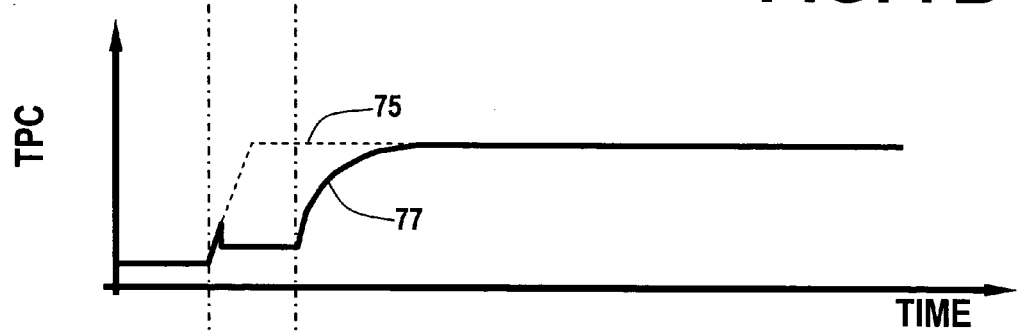
Figure 7D:

FIG. 7D shows tip-in flag state indicative of tip-in management beginning at time T1 and tip-in management conclusion at time T2. FIG. 7B shows the throttle pedal position signal, PPS, which corresponds substantially to the throttle pedal position. Without the ETC tip-in management of the present invention, the throttle position command, TPC, would generate in substantial correspondence to the rate and relative magnitude of the pedal position signal, PPS, as shown by the broken line 75 of FIG. 7C which is substantially a conventional first order filtered throttle response. And, the engine speed would respond in substantial correspondence to the throttle position command, TPC, as illustrated by the broken line 73 in FIG. 7A. In accordance with the ETC tip-in management of the present invention, TPC is first maintained at a predetermined value and subsequently established in accordance with a low pass filter response. The predetermined maintenance value is preferably calibrated to be effective to reduce the occurrence of engine speed flare while at the same time not present any noticeable engine response lag to the vehicle operator. The time constant of the low pass filter response may be a function of the throttle position as described previously. The maintained and filtered TPC is shown by solid line 77 in FIG. 7C and the corresponding engine speed response is shown by solid line 71 of FIG. 7A. Such an engine response would substantially reduce the transient excitation of the driveline and the engine flare. While not separately illustrated, spark retard in an electronic spark timing system may be introduced also in response to the tip-in flag setting as a way to quickly effect torque reduction to address transient excitation of the driveline and the engine flare.

The present invention has been described in accordance with certain preferred and alternative embodiments that are intended to be taken by way of non-limiting examples. Those skilled in the art will recognize various other alternative implementations for practicing the invention within the scope of the following claims.

The invention claimed is:

1. Method for actively damping a driveline in a vehicular powertrain including an internal combustion engine responsive to a throttle pedal position and controllably coupled to said driveline through a torque transfer device, comprising:
   providing an engagement command including a driveline feedback portion having an acceleration term and a jerk term, said acceleration term being determined as a function of a driveline member acceleration and said jerk term being determined as a function of the driveline member jerk; and
   controlling engagement of the torque transfer device in accordance with the engagement command.

2. The method of claim 1 wherein the engagement command further comprises a feedforward control portion determined as a function of throttle position.

3. The method of claim 1 wherein said engagement command further comprises a closed loop slip control portion determined as a function of the slip across the torque transfer device and a target slip.

4. The method of claim 1 wherein said engagement command further comprises a closed loop engine speed control portion determined as a function of the engine speed and target speed.

5. The method of claim 1 wherein said driveline includes a multiple speed ratio transmission and said acceleration and jerk terms are further determined as function of the currently active one of said multiple speed ratios.

6. The method of claim 5 wherein said acceleration and jerk terms are further determined as functions of throttle pedal position and vehicle speed.

7. The method of claim 2 wherein said engagement command further comprises a closed loop slip control portion determined as a function of the slip across the torque transfer device and a target slip.

8. The method of claim 2 further comprising:
   detecting a throttle tip-in condition and upon said detection delaying changes to the engagement command until engine torque is driving the torque transfer device.

9. The method of claim 3 further comprising:
   detecting a throttle tip-in condition and upon said detection delaying changes to the engagement command until engine torque is driving the torque transfer device.

10. The method of claim 6 further comprising:
    detecting a throttle tip-in condition and upon said detection delaying changes to the engagement command until engine torque is driving the torque transfer device.

11. Method for actively damping a driveline in a vehicular powertrain including an internal combustion engine responsive to a throttle pedal position and controllably coupled to said driveline through a torque transfer device, comprising:
    providing a feedforward control term as a function of throttle pedal position;
    calculating a first driveline damping control term as a function of acceleration of a driveline member;
    calculating a second driveline damping control term as a function of jerk of the driveline member;
    summing the feedforward control term and the first and second driveme damping control terms into a torque transfer device engagement command; and
    controlling engagement of the torque transfer device in accordance with the engagement command.

12. The method of claim 11 further comprising providing a closed loop slip control term as a function of the slip across the torque transfer device and a target slip and additionally summing the slip control term into the torque transfer device engagement command.

13. The method of claim 11 wherein said driveline includes a multiple speed ratio transmission and said acceleration and jerk terms are further determined as function of the currently active one of said multiple speed ratios.

14. The method of claim 13 wherein said acceleration and jerk terms are further determined as functions of throttle pedal position and vehicle speed.

15. The method of claim 12 further comprising:
    detecting a throttle tip-in condition and upon said detection delaying changes to the engagement command until engine torque is driving the torque transfer device.

16. Method for operating a torque transfer device controlled in accordance with an engagement command, said torque transfer device disposed between the output of an internal combustion engine responsive to a throttle pedal position and the input of a driveline, comprising:
    monitoring throttle pedal position change;
    calculating a feedforward control term as a function of throttle pedal position;
    calculating a closed loop slip control term as a function of the slip across the torque transfer device and a target slip;
    calculating acceleration and jerk of a driveline member;
    calculating a driveline damping control term as a function of said acceleration and jerk of the driveline member for addition to said engagement command, said driveline damping control term being effective to attenuate acceleration and jerk in the driveline member;
    calculating the engagement command as the summation of the feedforward, closed loop slip and driveline damping control terms; and
    detecting when throttle pedal position increases in excess of a predetermined rate and in response delaying changes to the engagement command until engine torque is driving the torque transfer device.

17. The method of claim 16 wherein said driveline includes a multiple speed ratio transmission and said driveline damping control term is further calculated as a function of throttle pedal position and the currently active one of said multiple speed ratios.

* * * * *